US012562002B2

(12) United States Patent
Vu et al.

(10) Patent No.: US 12,562,002 B2
(45) Date of Patent: Feb. 24, 2026

(54) METHOD OF MASKED FACE RECOGNITION BY ARTIFICIAL INTELLIGENCE TECHNOLOGY

(71) Applicant: VIETTEL GROUP, Ha Noi (VN)

(72) Inventors: Thi Hanh Vu, Hai Phong (VN); Van Muoi Pham, Luong Tai District (VN); Manh Quy Nguyen, Ha Noi (VN)

(73) Assignee: VIETTEL GROUP, Ha Noi (VN)

( * ) Notice: Subject to any disclaimer, the term of this patent is extended or adjusted under 35 U.S.C. 154(b) by 292 days.

(21) Appl. No.: 18/447,550

(22) Filed: Aug. 10, 2023

(65) Prior Publication Data

US 2024/0054814 A1    Feb. 15, 2024

(30) Foreign Application Priority Data

Aug. 12, 2022    (VN) .............................. 1-2022-05144

(51) Int. Cl.
| | |
|---|---|
| *G06V 40/16* | (2022.01) |
| *G06V 10/74* | (2022.01) |
| *G06V 10/774* | (2022.01) |
| *G06V 10/776* | (2022.01) |
| *G06V 10/82* | (2022.01) |

(52) U.S. Cl.
CPC .......... *G06V 40/172* (2022.01); *G06V 10/761* (2022.01); *G06V 10/774* (2022.01); *G06V 10/776* (2022.01); *G06V 10/82* (2022.01); *G06V 40/161* (2022.01); *G06V 40/171* (2022.01)

(58) Field of Classification Search
CPC .. G06V 40/172; G06V 10/761; G06V 10/774; G06V 10/776; G06V 10/82; G06V 40/161; G06V 40/171; G06V 10/454; G06V 40/169
See application file for complete search history.

(56) References Cited

U.S. PATENT DOCUMENTS

| | | | |
|---|---|---|---|
| 12,190,481 B2 * | 1/2025 | Song | G06T 3/00 |
| 2020/0082157 A1 * | 3/2020 | Susskind | G06V 40/169 |
| 2021/0328801 A1 * | 10/2021 | Sly | G06V 40/168 |
| 2021/0374468 A1 * | 12/2021 | Chandraker | G06N 3/084 |
| 2022/0100989 A1 * | 3/2022 | Zhu | G06F 21/602 |
| 2022/0327862 A1 * | 10/2022 | Yang | G06V 40/172 |
| 2024/0203160 A1 * | 6/2024 | Lee | G06V 40/172 |
| 2024/0265598 A1 * | 8/2024 | Kang | G06V 10/82 |
| 2025/0069432 A1 * | 2/2025 | Yoon | G06V 40/172 |

* cited by examiner

*Primary Examiner* — Wesley J Tucker
(74) *Attorney, Agent, or Firm* — patenttm.us

(57) ABSTRACT

The present invention provides a method of masked face recognition from images by artificial intelligence technology including four steps: step 1: generating the images of face wearing a mask; step 2: training a deep learning model for face detection while wearing a mask; step 3: training the deep learning model for face feature extraction while wearing a mask; step 4: building a full pipeline of masked face recognition from images using the trained models from step 2, step 3, and some post-processing algorithms. The method aims to improve the accuracy of identity verification in the context of wearing masks has become popular and compulsory in life.

4 Claims, 1 Drawing Sheet

Normal face image

Face landmarks detection 68 facial landmarks 6 from 68 facial landmarks describe the shape of the mask on the face Mask image selection 4 types of mask: Medical mask, N95 mask, KN95 mask, Fabric mask 3 positions:

Left rotating    Straight    Right rotating 6 key-points of the mask

Mask image adjustment

Brightness Saturation

Masked face image

METHOD OF MASKED FACE RECOGNITION BY ARTIFICIAL INTELLIGENCE TECHNOLOGY

BACKGROUND OF THE INVENTION

Technical Field of the Invention

The disclosure relates to a method of face recognition while wearing a mask from images using artificial intelligence technology. Specifically, the proposed method is applied for identity verification using face image, especially while the subject is wearing a mask.

Technical Status of the Invention

Recently, face recognition technology has become popular in life with diverse applications such as automatic timekeeping system, unlocking the house or device by face identification, managing people going in/out of the company, etc. However, in the Covid-19 pandemic, people must always wear a mask when going out, at work or in public places. It makes the traditional face recognition method not work well since the method works based on the full features of the face for identifying. Furthermore, people must take off the mask for identifying which leads to some inconveniences, especially the rapid spread of disease. Therefore, this invention proposes a method of masked face recognition to solve that problem.

BRIEF SUMMARY OF THE INVENTION

The invention provides a method of face recognition while wearing a mask from images, which aims to improve the accuracy of identity verification in the context of wearing masks has become popular and compulsory.

The proposed method includes:

Step 1: generating the images of face wearing a mask; this step is performed based on a mask generation algorithm from normal face images. This step aims to generate training data for deep learning models.

Step 2: training a deep learning model for face detection; YOLO5Face model is proposed to use and is trained using the generated data from step 1. This step aims to increase the face detection accuracy while wearing a mask.

Step 3: training the deep learning model for face feature extraction while wearing a mask; ArcFace loss function is proposed to use, and the model is trained using the generated data from step 1. This step aims to increase the face recognition accuracy while wearing a mask.

Step 4: building a full pipeline of masked face recognition from images using the trained models from step 2, step 3, and some post-processing algorithms.

DETAILED DESCRIPTION OF THE INVENTION

The detailed description of the invention is interpreted in connection with the drawings, which are intended to illustrate variations of the invention without limiting the scope of the patent.

In this description of the invention, the terms of "YOLO5Face", "ResNet", "Dlib", "ArcFace", "Adam", "Cross-entropy", "Faiss", "$L_2$-norm", and "Euclidean" are proper nouns, which are the name of the model or the dataset.

Figure 1:
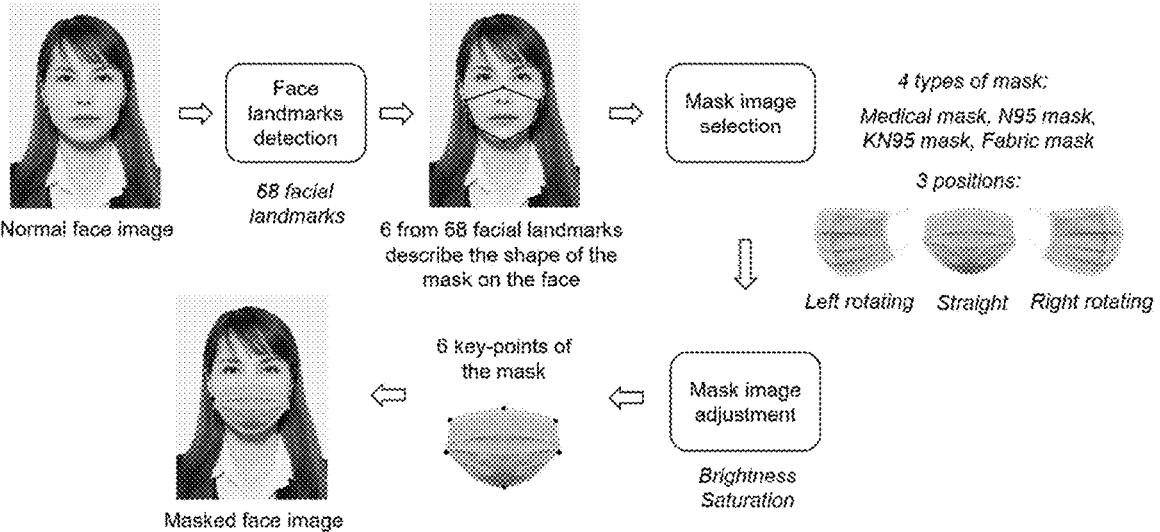
FIG. 1 is the description of generating the images of face wearing a mask from normal face images.

FIG. 1 is the description of step 1: Generating the images of face wearing a mask to train deep learning models, including face detection model and face feature extraction model. In other words, several types of masks are automatically put on the normal face images and adjusted so that the face wearing mask looks real. This step consists of three sub-steps as follows:

Step 1.1: detecting the face landmarks which describe the shape of the mask on the face and calculating the tilt of the face to choose a suitable position of the mask.

The input face image is fed into a landmark detection model from the Dlib library (this is an opensource library), the output is 68 facial landmarks. Then, 6 of 68 facial landmarks describe the shape of the mask on the face are: 30, 2, 5, 9, 13, and 16 (FIG. 1). The tilt of the face is calculated based on the angle between two lines: the line connects the midpoint of the eyes and the top of the nose (i.e., the nose bridge) and the line connects the midpoint of the eyes and the midpoint of the lip.

Step 1.2: selecting a mask to put on the face image.

It's necessary to select a suitable mask for an existing face. Basing on the tilt of the face calculated in step 1.1, the mask image is selected and adjusted to put on the existing face image, by the following rules:

If the tilt of the face >15°: defining as the left rotating face, then a left rotating mask image is selected.

If the tilt of the face <−15°: defining as the right rotating face, then a right rotating mask image is selected.

The remaining cases are defined as straight face: a straight mask image is selected.

To enhance the data, the sample masks consist of medical mask, N95 mask, KN95 mask, and fabric mask. Each type of mask consists of three images corresponding to three face positions: rotating left, rotating right and straight.

Step 1.3: adjusting the mask image to match to the face image.

After selecting a mask, it is necessary to adjust the brightness and saturation of the mask image compared to the face image. This aims to make the face wearing mask look real. The following contents refer to some available formulas; however, the formulas are raised to indicate how to apply in this patent.

Adjusting the brightness of the mask image based on the brightness of the face image.

First, the brightness intensity of an image is calculated by the average of three V channels from HSV image (Hue, Saturation, Value). Next, the difference of the brightness intensity between the face image and the mask image is computed by the formula:

$$\Delta V = \frac{1 + (C_{face} - C_{mask})}{255}$$

where $\Delta V$ is brightness intensity difference, $C_{face}$ is of the face image, $C_{mask}$ the brightness intensity of the mask image. Then, the brightness of the mask image is adjusted by changing the value of V channels by the formula:

$$V = \min(255, V \times \Delta V)$$

Adjusting the saturation of the mask image based on the saturation of the face image.

The input of this step is the face image and the mask image which was adjusted the brightness above. The saturation intensity of an image is calculated by the average of three S channels from HSV image (Hue, Saturation, Value). Then, the difference of the saturation intensity between the face image and the mask image is computed by the formula:

$$\Delta S = \frac{1 - (S_{face} - S_{mask})}{255}$$

where $\Delta S$ is saturation intensity difference, $S_{face}$ is the saturation intensity of the face image, $S_{mask}$ is the saturation intensity of the mask image. Then, the saturation of the mask image is adjusted by changing the value of S channels by the formula:

$$S = \min(255, S \times \Delta S)$$

After the step 1.3, the adjusted mask image is put on the face image so that the 6 key-points on the mask are matched to 6 facial landmarks from step 1.1. The final output is the face image while wearing a mask.

Step 2: training a deep learning model for face detection while wearing a mask.

The deep learning model is proposed to use is YOLO5Face. This model can detect the faces from an image; however, it doesn't work well with the faces wearing a mask. Therefore, it's necessary to train the model with the generated data from step 1. Based on many experiments, the model has worked well when it is trained with the hyper-parameters including: the number of training epoch is 250, the learning rate is $10^{-2}$, the batch size is 256, the loss function is Cross-entropy, the optimization algorithm is Adam, and the weight decay is 0.0005 to avoid the over-fitting problem.

Step 3: training the deep learning model for face feature extraction while wearing a mask.

After the detected face is cut and aligned, another deep learning model is trained to learn the features of the face while wearing a mask, the output of the model is an embedded vector. The model is built based on the ResNet architecture as an embedded network and is trained using the Arcface loss function by the generated data from step 1. Based on many experiments, the model has worked well when it is trained with the hyper-parameters including: the number of training epoch is 30, the learning rate is 0.1, the batch size is 512, the loss function is Arcface, the optimization algorithm is Adam, and the weight decay is 0.0005 to avoid the over-fitting problem.

Step 4: building a full pipeline of masked face recognition from images using the trained models from step 2, step 3, and some post-processing algorithms.

Figure 2:
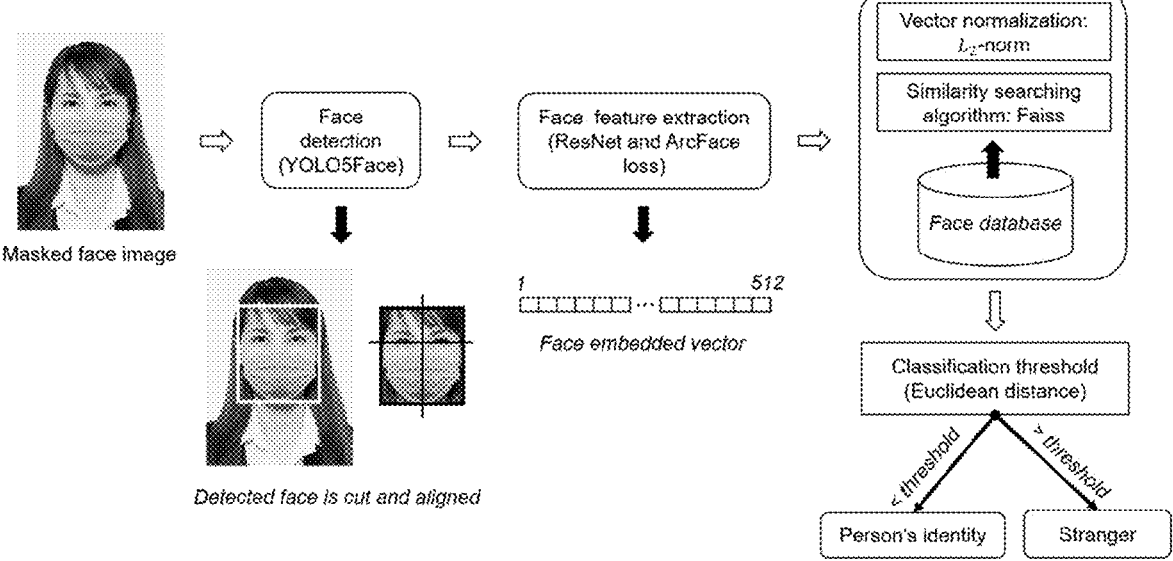
FIG. 2 is the description of a full pipeline for face recognition while wearing a mask using the trained models.

After step 1, 2, 3, two trained models are used as the components of a full pipeline for face recognition while wearing a mask. FIG. 2 illustrates the full pipeline which consists of two trained models and some post-processing algorithms.

First, the input images (from IP cameras, or devices such as tablets, personal computers, phones, cameras, etc.) are fed into the face detection model, which is the trained YOLO5Face model in step 2. The output returns the position of the faces in the images (both face wearing a mask and normal face without mask), and the detected faces are cut and aligned. After that, each of cut and aligned face image is fed into the face feature extraction model in step 3, the output returns the feature embedding vector of each face. Next, the feature vector is normalized using the $L_2$-norm algorithm. The following step is the process of searching the face in the database to determine the identity. This process uses the similarity searching algorithm from Faiss library (this is an opensource library). Similarity searching is performed by calculating the similarity of the feature vector of a face image and all the feature vectors of the faces in the database. Herein, the Euclidean distance algorithm ($L^2$ distance) is used to find the face in the database which has the maximum similarity to the input face (i.e., the distance is smallest). Finally, a distance classification threshold is chosen to conclude that it is "the same person" or "different person". If it is "the same person" then the last output returns the person's identity; in the opposite, if it is "different person" then the last output returns the result as "stranger". Based on many experiments, the proposed distance classification threshold is 1.01.

Although the above descriptions contain many specifics, they are not intended to be a limitation of the embodiment of the invention, but are intended only to illustrate some preferred execution options.

The invention claimed is:

1. A method of masked face recognition from images by artificial intelligence technology comprising:

Step 1: generating the images of face wearing a mask; this step is performed based on a mask generation algorithm from normal face images, this step aims to generate training data for deep learning models;

Step 2: training a deep learning model for face detection while wearing a mask; YOLO5Face model is proposed to use and is trained using the generated data from step 1, this step aims to increase the face detection accuracy while wearing a mask;

Step 3: training the deep learning model for face feature extraction while wearing a mask; ArcFace loss function is proposed to use, and the model is trained using the generated data from step 1, this step aims to increase the face recognition accuracy while wearing a mask;

Step 4: building a full pipeline of masked face recognition from images using the trained models from step 2, step 3, and some post-processing algorithms, further comprising:

in step 4, a full pipeline of masked face recognition is built using the trained models from step 2, step 3 and some post-processing algorithms;

first, the input images (from IP cameras, or devices such as tablets, personal computers, phones, cameras, etc.) are fed into the face detection model, which is the trained YOLO5Face model in step 2; the output returns the position of the faces in the images (both face wearing a mask and normal face without mask), and the detected faces are cut and aligned; after that, each of cut and aligned face image is fed into the face feature extraction model in step 3, the output returns the feature embedding vector of each face; next, the feature vector is normalized using the $L_2$-norm algorithm; the following step is the process of searching the face in the database to determine the identity; this process uses the similarity searching algorithm from Faiss library (this is an open-source library); similarity searching is performed by calculating the similarity of the feature vector of a face image and all the feature vectors of the faces in the database; herein, the Euclidean distance algorithm ($L^2$ distance) is used to find the face in the database which has the maximum similarity to the input face (i.e., the distance is smallest); finally, a distance classification threshold is chosen to conclude that it is "the same person" or "different person"; if it is "the same person" then the last output returns the person's identity; in the opposite, if it is "different person" then the last output returns the result as "stranger"; based on many experiments, the proposed distance classification threshold is 1.01.

2. The method of masked face recognition from images by artificial intelligence technology according claim 1, further comprising:

in step 1, to enhance the data, the sample masks consist of medical mask, N95 mask, KN95 mask, and fabric mask, each type of mask consists of three images corresponding to three face positions: rotating left, rotating right and straight.

3. The method of masked face recognition from images by artificial intelligence technology according claim 1, further comprising:

in step 2, the deep learning model is proposed to use is YOLO5Face; this model can detect the faces from an image; train the model with the generated data from step 1; trained with the hyper-parameters including: the number of training epoch is 250, the learning rate is $10^{-2}$, the batch size is 256, the loss function is Cross-entropy, the optimization algorithm is Adam, and the weight decay is 0.0005 to avoid the over-fitting problem.

4. The method of masked face recognition from images by artificial intelligence technology according claim 1, further comprising:

in step 3, after the detected face is cut and aligned, another deep learning model is trained to learn the features of the face while wearing a mask, the output of the model is an embedded vector; the model is built based on the ResNet architecture as an embedded network and is trained using the Arcface loss function by the generated data from step 1; training with the hyper-parameters including: the number of training epoch is 30, the learning rate is 0.1, the batch size is 512, the loss function is Arcface, the optimization algorithm is Adam, and the weight decay is 0.0005 to avoid the over-fitting problem.

\* \* \* \* \*